UNITED STATES PATENT OFFICE.

JOHN WOODS BECKMAN, OF BERKELEY, CALIFORNIA.

METHOD OF REDUCING METALS.

1,160,822.  Specification of Letters Patent.  Patented Nov. 16, 1915.

No Drawing.  Application filed December 9, 1914. Serial No. 876,346.

*To all whom it may concern:*

Be it known that I, JOHN WOODS BECKMAN, a subject of the King of Sweden, (who has declared his intention to become a citizen of the United States,) residing at Berkeley, in the county of Alameda and State of California, have invented a new and useful Method of Reducing Metals, of which the following is a full, clear, and exact description.

My invention has relation to a novel method of reducing metals from their ores, and is designed to provide a simple, efficient and economical method of this character, which will eliminate the use of solid carbonaceous reducing material, such as coke.

In carrying out my invention, I employ a liquid or gaseous reducing media containing carbon and hydrogen both free and in chemical combination. The method is carried out as follows: The ore or oxid to be reduced is mixed with a suitable fluxing material, and is heated to such a temperature that the mixture becomes liquid. This temperature will vary with the ore being operated upon, as well as the metal to be produced. When the mixture has become thoroughly liquid, I force therethrough a reducing media, such as a gas or a vapor obtained from oils. This causes a violent reaction to take place throughout the entire mass, and the oxygen is combined with the hydrogen and carbon of the gas and is carried off in the shape of carbonic acid and water, leaving a reduced metal with a slag layer floating on top.

With some metals and also depending upon the composition of the gas or vapor used as the reducing agent, it may be necessary to supply extra heat to supplant the heat which is absorbed during reaction and which may be carried off with departing gases. One way by which this may be accomplished is by admitting small amounts of air to the reducing gases, which air, combining with the gases, liberates the desired heat and keeps the temperature of the mass at the proper degree.

Occasionally there are oxids which vaporize before they reach a temperature suitable for reaction. In such cases, I mix these oxids with some material capable of forming a mixture or a compound less volatile than the pure oxid and which will at the same time leave the oxid in a readily reducible condition.

In order that my invention may be more clearly understood, I will now describe in detail the procedure in the production of iron from iron ore. This is as follows: The ore is first preferably analyzed to learn its contents, and from the result of such analysis, it is possible to regulate the necessary materials to be added to finally obtain a fusible slag. When the desired mixture is made, the iron ore is preheated in a rotary kiln or other suitable furnace to a temperature close to the melting point of the ore. Upon reaching this temperature, the ore is transferred to another heating apparatus to be finally heated to a temperature approximating 2000 degrees C., when it becomes liquid. This second heating can be done in specially constructed furnaces, either by means of suitable fuel or by electric heat in an electric furnace. I prefer to employ an electric furnace for this purpose, since by the use of such furnace, I an able to obtain a high initial temperature for the subsequent reactions. Heretofore, so far as I am aware, processes of this character have not been successful for reasons which are believed to be due largely to the inability to get the proper initial temperature. This I can readily obtain in an electric furnace; and by mixing a suitable amount of air with the reducing gases, as hereinafter described, the necessary high temperature can be maintained throughout the reaction. When heated to this temperature, the mixture is then transferred to a vessel similar in construction to a Bessemer converter, and gas obtained from the cracking of natural oils or vapors derived from natural oils is forced through the liquid iron ore. The gas obtained in cracking the oil is mostly composed of hydrogen and methane, and the following reactions take place:

$$Fe_2O_3FeO + 8H = 3Fe + 4H_2O$$
$$Fe_2O_3FeO + CH4 = 3Fe + CO_2 + 2H_2O$$

Internal heat is supplied to the melt to supplant such as is dissipated by means of the gases which are driven off, as well as the heat which is absorbed in the material itself, due to the reactions. The exact amount of air to be added to supply this internal heat will depend upon the conditions, such as the composition of the gas and also the temperature to which the ore has been heated prior to the reactions taking place. Sufficient air should be supplied to maintain the mix at the temperature of reaction.

The final product obtained is a pure iron practically free of any carbon content whatever. By teeming this iron into another container, with carbon and alloying materials, steel may be formed directly.

My invention is especially advantageous in the reduction of metals from their oxids or their oxid ores, but may be used in connection with sulfid ores, although not as advantageously.

I claim:

1. The herein described method of reducing metals from their ores or oxids, which consists in subjecting them while in a liquid state to the action of a reducing gas or vapor forced into the molten mass, and in admitting air with said gas or vapor to thereby maintain the temperature of the mass at the temperature of reaction.

2. The herein described method of reducing metals from their ores, which consists in melting down the ores to a liquid condition, then transferring them to a converter and forcing through the liquid mass a reducing gas obtained from the cracking of natural oils, and admitting with said gas atmospheric air to maintain the temperature of the molten mass at the reaction point during the reaction period.

3. The herein described method of reducing oxids which consists in melting them in an electric furnace to a highly heated liquid condition, and then forcing therethrough a reducing gas or vapor mixed with atmospheric air, the air acting to maintain the necessary reaction temperature.

4. The herein described method of reducing metals from their ores, which consists in heating them to a temperature approximating 2000 degrees C. to thereby liquefy them, and then forcing through the highly heated liquid mass a reducing gas or vapor mixed with air.

In testimony whereof, I have hereunto set my hand.

JOHN WOODS BECKMAN.

Witnesses:
FRANK CHARLES CARNECKI,
W. W. HEALEY.